(12) United States Patent
Oh

(10) Patent No.: US 9,696,573 B2
(45) Date of Patent: Jul. 4, 2017

(54) DISPLAY MODULE AND LIQUID CRYSTAL DISPLAY DEVICE INCLUDING THE SAME

(71) Applicant: LG Display Co., Ltd., Seoul (KR)

(72) Inventor: Guen Taek Oh, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/167,246

(22) Filed: May 27, 2016

(65) Prior Publication Data
US 2016/0349568 A1     Dec. 1, 2016

(30) Foreign Application Priority Data
May 28, 2015   (KR) .................. 10-2015-0075337

(51) Int. Cl.
*G02F 1/1333*     (2006.01)
*F21V 8/00*      (2006.01)

(52) U.S. Cl.
CPC ..... *G02F 1/133308* (2013.01); *G02B 6/0051* (2013.01); *G02F 2001/133314* (2013.01); *G02F 2001/133317* (2013.01)

(58) Field of Classification Search
CPC .................. G02F 1/1333; G02F 2001/133317
See application file for complete search history.

(56) References Cited

U.S. PATENT DOCUMENTS

| 2014/0176852 A1 | 6/2014 | Ha | |
| 2016/0209697 A1* | 7/2016 | Chang | G02F 1/133308 |
| 2016/0231501 A1* | 8/2016 | Horiguchi | G02B 6/0088 |
| 2016/0313496 A1* | 10/2016 | Hirayama | G02B 6/0036 |
| 2016/0342014 A1* | 11/2016 | Liu | G02F 1/133308 |
| 2016/0357053 A1* | 12/2016 | Chen | G02F 1/13 |
| 2016/0363718 A1* | 12/2016 | Zhou | G02F 1/133308 |
| 2016/0370530 A1* | 12/2016 | Shimizu | G02B 6/0083 |
| 2016/0370639 A1* | 12/2016 | Que | G02B 6/0055 |
| 2016/0370641 A1* | 12/2016 | Hirasawa | G02F 1/133308 |
| 2017/0010501 A1* | 1/2017 | Kamiyama | G02F 1/133308 |

FOREIGN PATENT DOCUMENTS

| KR | 10-2004-0031514 A | 4/2004 |
| KR | 10-2006-0132370 A | 12/2006 |
| KR | 10-2007-0001546 A | 1/2007 |
| KR | 10-2009-0120097 A | 11/2009 |
| KR | 10-2011-0030953 A | 3/2011 |
| KR | 10-2012-0100431 | 9/2012 |
| KR | 10-2013-0031600 A | 3/2013 |
| KR | 10-2013-0068548 A | 6/2013 |
| KR | 10-2013-0079110 | 7/2013 |
| KR | 10-2014-0082366 A | 7/2014 |
| KR | 10-2014-0082557 | 7/2014 |

OTHER PUBLICATIONS

Office Action for Korean Patent Application No. KR 10-2017-0054945, May 23, 2017, 7 Pages (With Concise Explanation of Relevance).

* cited by examiner

*Primary Examiner* — Timothy L Rude
(74) *Attorney, Agent, or Firm* — Fenwick & West LLP

(57) ABSTRACT

A display module, and a liquid crystal display (LCD) device including the same, includes a guide panel surrounding a side surface of a liquid crystal panel. The guide panel and a cover bottom are fastened to each other by hooks.

20 Claims, 6 Drawing Sheets

DISPLAY MODULE AND LIQUID CRYSTAL DISPLAY DEVICE INCLUDING THE SAME

CROSS-REFERENCE TO RELATED APPLICATIONS

This application claims the benefit of Republic of Korea Patent Application No. 10-2015-0075337 filed on May 28, 2015, which is hereby incorporated by reference as if fully set forth herein.

BACKGROUND

Field of the Disclosure

The present disclosure relates to a display module and a liquid crystal display (LCD) device including the same.

Discussion of the Related Art

Examples of flat panel display (FPD) devices include liquid crystal display (LCD) devices, organic light emitting display devices, etc.

Among FPD devices (also herein referred to as display devices), LCD devices display an image using liquid crystals. LCD devices have features such as thinness, lightness, low power consumption, and high image quality.

Since LCD devices are not self-emitting devices, a backlight unit is provided under a panel, and the panel displays an image by using light emitted from the backlight unit.

FIG. 1 is a diagram schematically illustrating a cross-sectional surface of a related art LCD device.

As illustrated in FIG. 1, the related art LCD device includes a display module 10 that includes a liquid crystal panel 11, a guide panel 12, a light guide panel 13, a light source (not shown), and a cover bottom 14; a middle frame 20; and a rear cover 30.

A method of manufacturing the related art LCD device will be briefly described below.

After the display module 10 is manufactured, a side surface of the display module 10 is covered by the middle frame 20, and a whole rear surface of the display module 10 is covered by the cover bottom 30.

Therefore, portions other than a front surface of the display module 10 are surrounded by the middle frame 20 and the cover bottom 30.

In this case, the display module 10 and the cover bottom 30 are fastened to each other by a fastening device such as a bolt; the cover bottom 30 and the middle frame 20 are also fastened to each other by a fastening device such as a bolt; and the display module 10 and the middle frame 20 are fastened to each other by a fastening device such as a bolt.

In the related art LCD device, as illustrated in FIG. 1, since the whole rear surface of the display module 10 is covered by the cover bottom 30, a thickness of the LCD device includes a thickness of the cover bottom 30.

In the related art LCD device, a portion of the front surface of the display module 10 may be covered by the middle frame 20, but as illustrated in FIG. 1, only the side surface of the display module 10 may be covered by the middle frame 20.

Since a side surface of the liquid crystal panel 11 configuring the display module 10 is covered by the middle frame 20, as illustrated in FIG. 1, the guide panel 12 configuring the display module 10 of the related art does not cover the side surface of the liquid crystal panel 11.

Moreover, in order to reduce a thickness of a border (hereinafter referred to as a bezel) which cannot display an image, the guide panel 12 does not cover the side surface of the liquid crystal panel 11.

Therefore, there is a high possibility that the side surface of the liquid crystal panel 11 is damaged in a process of manufacturing the display module 10.

Moreover, the guide panel 12 and the cover bottom 14 that configure the display module 10 are fastened to each other by a fastening means such as a bolt, which complicates a process of manufacturing the LCD device.

SUMMARY

Accordingly, the present disclosure is directed to a display module and an LCD device including the same that substantially obviate one or more problems due to limitations and disadvantages of the related art.

An aspect of the present disclosure includes a display module, or an LCD device including the same, in which a guide panel surrounds a side surface of a liquid crystal panel, and the guide panel and a cover bottom are fastened to each other by hooks.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages of the disclosure, as embodied and broadly described herein, a display module includes a liquid crystal panel, a guide panel supporting a rear surface of the liquid crystal panel and surrounding a side surface of the liquid crystal panel, a light source unit irradiating light onto the liquid crystal panel, and a cover bottom supporting the light source unit. A plurality of hooks fastened to the guide panel are disposed in the cover bottom, where the plurality of hooks include a horizontal hook and a vertical hook. The horizontal hook protrudes in a direction parallel to a plane of the cover bottom and is inserted into and fixed to a hook groove disposed in the guide panel. The vertical hook protrudes in a direction perpendicular to the plane of the cover bottom and is inserted into a hook insertion part disposed in the guide panel.

In another aspect of the present disclosure, an LCD device includes a display module and a rear cover covering a portion of a rear surface of the display module and protecting a printed circuit board driving the display module. The display module includes a liquid crystal panel, a guide panel supporting a rear surface of the liquid crystal panel and surrounding a side surface of the liquid crystal panel, a light source unit irradiating light onto the liquid crystal panel, and a cover bottom supporting the light source unit. A plurality of hooks fastened to the guide panel are disposed in the cover bottom, where the plurality of hooks include a horizontal hook and a vertical hook. The horizontal hook protrudes in a direction parallel to a plane of the cover bottom and is inserted into and fixed to a hook groove disposed in the guide panel. The vertical hook protrudes in a direction perpendicular to the plane of the cover bottom and is inserted into a hook insertion part disposed in the guide panel.

In another aspect of the present disclosure, a display module includes a liquid crystal panel, a light source unit irradiating light onto the liquid crystal panel, a cover bottom supporting the light source unit, and a guide panel supporting a rear surface of the liquid crystal panel. The cover bottom includes a plane part extending parallel to a top surface of the liquid crystal panel, a first hook portion extending perpendicular to the top surface of the liquid crystal panel, and a second hook portion between the plane part and the first hook portion. The second hook portion extends in a direction different from a direction in which the first hook portion extends, and the second hook portion is offset from the plane part by a first distance in a direction perpendicular to the top surface of the liquid crystal panel. The guide panel includes a hook insertion part configured to receive the first hook portion and a hook groove configured to receive the second hook portion.

It is to be understood that both the foregoing general description and the following detailed description of the present disclosure provide examples intended to further illustrate and explain the invention as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Hereinafter, embodiments of the present disclosure will be described in detail with reference to the accompanying drawings.

Figure 2:
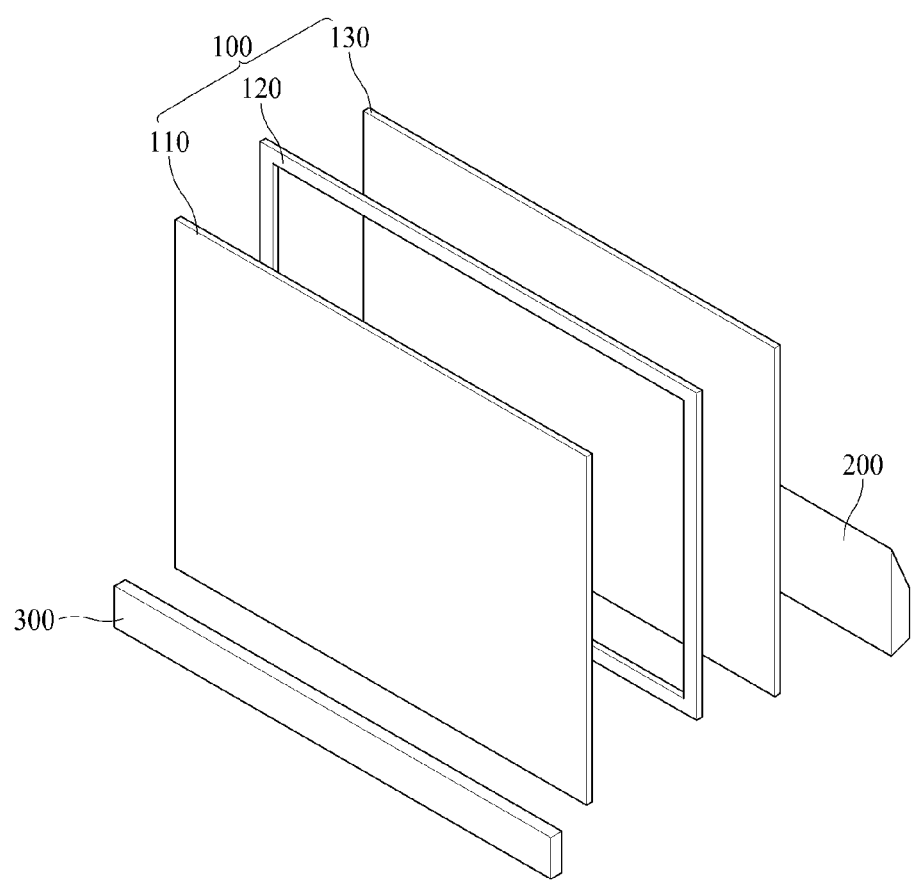
FIG. 2 is an exploded perspective view illustrating an LCD device according to an embodiment.

FIG. 2 is an exploded perspective view illustrating an LCD device according to an embodiment.

As illustrated in FIG. 2, the LCD device according to an embodiment may include a display module 100 and a rear cover 200 that covers a portion of a rear surface of the display module 100 and protects a printed circuit board (PCB, not shown) driving the display module 100.

A portion other than a region of the display module 100 covered by the rear cover 200 may be exposed to the outside. That is, a front surface and a side surface of the display module 100 may be exposed to the outside, and a portion of a rear surface of the display module 100 may be exposed to the outside.

The LCD device may further include a decorative cover 300 that covers a front lower end of the display module 100. Various buttons for controlling or driving the LCD device may be provided in the decorative cover 300.

First, as illustrated in FIG. 2, the display module 100 may include a liquid crystal panel 110, a guide panel 120 that supports a rear surface of the liquid crystal panel 110 and surrounds a side surface of the liquid crystal panel 110, a light source unit (not shown) that irradiates light onto the liquid crystal panel 110, a cover bottom 130 that supports the light source unit and includes a plurality of hooks fastened to the guide panel 120, and a PCB (not shown) that drives the liquid crystal panel 110.

The liquid crystal panel 110 may include an upper substrate, a lower substrate, and a liquid crystal injected between the upper substrate and the lower substrate. The upper substrate may be bonded to the lower substrate.

An upper polarizing film may be attached to a front surface of the upper substrate, and a lower polarizing film may be attached to a rear surface of the lower substrate. A cover glass for protecting the upper substrate may be bonded to the front surface of the upper substrate.

The guide panel 120 may guide the liquid crystal panel 110 and may support the liquid crystal panel 110 with respect to an outer rear surface of the guide panel 120.

The light source unit (not shown) may include a light source such as one or more organic light emitting diodes (OLEDs). In the display module 100 having an edge type, the light source may be disposed on one side of the cover bottom 130, and a light guide panel that allows light incident from the light source to be irradiated in a direction toward the liquid crystal panel 110 may be disposed in the cover bottom 130. A plurality of optical films for diffusing or transmitting the light irradiated through the light guide panel may be disposed on a top of the light guide panel. In the display module 100 having the edge type, the light source may be disposed in the cover bottom 130, and a plate and a plurality of optical films for diffusing or transmitting the light emitted from the light source may be disposed on an upper end of the light source.

The cover bottom 130 may support the light source unit, and the hooks fastened to the guide panel 120 may be provided in the cover bottom 130.

The PCB (not shown) may drive various electronic elements provided in the liquid crystal panel 110.

A detailed configuration of the display module 100 will be described in detail with reference to FIGS. 6 to 12.

Second, the rear cover 200 may cover a portion of a rear surface of the display module 100 and may protect the PCB (not shown) disposed on the rear surface of the display module 100.

A portion other than a region of the display module 100 covered by the rear cover 200 may be exposed to the outside.

Since the display module 100 itself forms an outer appearance of the LCD device, a thickness of the LCD device may be equal to that of the display module 100. Accordingly, a thickness of the LCD device according to an embodiment is reduced compared to a thickness of a related art LCD device in which a rear cover surrounds a whole side surface and rear surface of a display module.

Third, the LCD device may further include the decorative cover 300 that covers the front lower end of the display module 100. The various buttons for controlling or driving the LCD device may be included in the decorative cover 300.

The decorative cover 300 may be fastened to the display module 100 by using one or more decorative cover hooks. Here, the decorative cover hooks may be provided in the decorative cover 300 or the display module 100, and a decorative cover hook hole or a decorative cover hook groove corresponding to each of the decorative cover hooks may be provided in the display module 100 or the decorative cover 300.

A portion of the decorative cover 300 extending in a direction toward a rear surface of the LCD device may be fastened to the rear cover 200 by a fastening hook or a bolt. Here, the fastening hook may be provided in the decorative cover 300 or the rear cover 200, and a fastening hook hole or a fastening hook groove corresponding to the fastening hook may be provided in the rear cover 200 or the decorative cover 300.

An example of a method of manufacturing the LCD device will be briefly described below.

First, the liquid crystal panel 100 may be manufactured.

The light source unit may be disposed between the guide panel 120 and the cover bottom 130, and the guide panel 120 may be fastened to the cover bottom 130 by the hooks.

The liquid crystal panel 110 may be attached to an upper end of each of the guide panel 120 and the cover bottom 130 by double-sided tape. Therefore, the display module 100 may be manufactured.

A PCB connected to the liquid crystal panel 110 may be disposed on the rear surface of the display module 100.

The rear cover 200 may be mounted on the rear surface of the display module 100 by a fastening device such as a bolt or a hook. The PCB may be covered by the rear cover 200.

The rear cover 200 may cover a lower end of the rear surface of the display module 100. Portions of the display module 100 which are not covered by the rear cover 200 may be exposed to the outside.

The decorative cover 300 may cover a lower end of a front surface of the display module 100 and may be fastened to a side surface of the display module 100 by one or more decorative cover hooks or bolts.

A portion of the decorative cover 300 extending in a direction toward the rear surface of the display module 100 may be fastened to the rear cover 200.

Through such processes, the LCD device may be manufactured.

Figure 3:
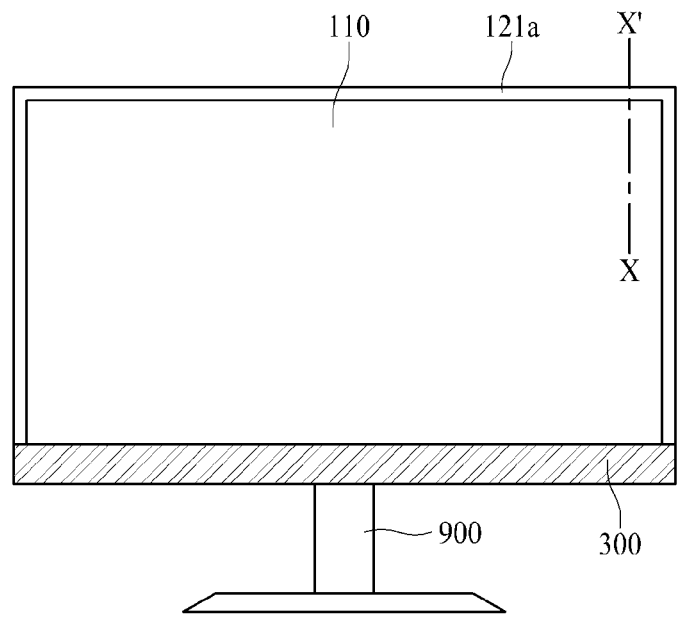
FIG. 3 is an example diagram illustrating a front surface of an LCD device according to an embodiment.
Figure 4:
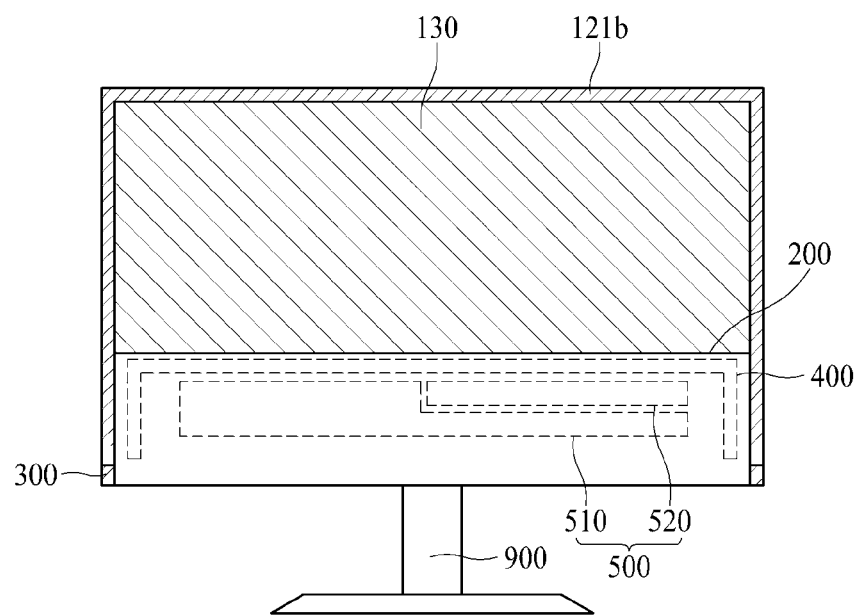
FIG. 4 is an example diagram illustrating a rear surface of an LCD device according to an embodiment.
Figure 5:
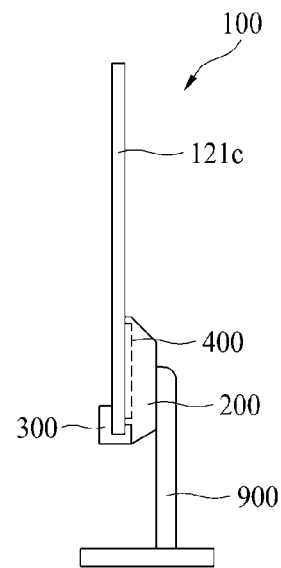
FIG. 5 is an example diagram illustrating a side surface of an LCD device according to an embodiment.

FIG. 3 is an example diagram illustrating a front surface of an LCD device according to an embodiment. FIG. 4 is an example diagram illustrating a rear surface of an LCD device according to an embodiment. FIG. 5 is an example diagram illustrating a side surface of an LCD device according to an embodiment.

The LCD device according to an embodiment may be applied to televisions (TVs) or monitors. In this case, in the LCD device, as illustrated in FIGS. 3 to 5, a support 900 may be mounted on the rear cover 200.

First, referring to FIG. 3, a first surface 121a of a first guide part which is provided in the guide panel 120 and surrounds a side surface of the liquid crystal panel 110 may be exposed to a front surface of the LCD device according to an embodiment.

The decorative cover 300 may cover a lower end of the front surface of the LCD device.

Referring to FIG. 4, a second surface 121b of the first guide part and a portion of a rear surface of the cover bottom 130 may be exposed to a rear surface of the LCD device according to an embodiment.

The other portion of the rear surface of the cover bottom 130 may be covered by the rear cover 200.

The rear cover 200 may be directly fastened to the rear surface of the cover bottom 130 by a fastening device such as a bolt or a hook.

The rear cover 200 may be fastened to a pad 400 mounted on the rear surface of the cover bottom 130 and may be mounted on the cover bottom 130.

A fastening force between the rear cover 200 and the cover bottom 130 increases due to the pad 400.

For example, the rear cover 200 may be fastened to the pad 400 which is provided in a tetragonal shape, and may be mounted on the cover bottom 130.

Moreover, as illustrated in FIG. 4, the rear cover 200 may be fastened to the pad 400, which has three connected segments each corresponding to a first, second, or third side of a tetragonal shape (e.g., a square, a rectangle, trapezoid) around the PCB 500. The pad 400 may be mounted on the cover bottom 130. The fourth side of the tetragonal shape corresponds to a fourth side of the PCB 500. In this case, a fastener (e.g., a fastening hook or bolt) may fasten a portion of the rear cover 200 to the decorative cover 300, where the portion of the rear cover 200 corresponds to the fourth side of the PCB 500.

A PCB 500 connected to the display module 100 may be fixed to the rear surface of the cover bottom 130 and may be covered by the rear cover 200. The PCB 500 may be one board or may include two or more boards. For example, the PCB 500 may include a first PCB 510, which supplies various signals to elements provided in the liquid crystal panel 110, and a second PCB 520, which supplies image data and various control signals to the first PCB 510.

Referring to FIG. 5, a third surface 121c of the first guide part may be exposed to the side surface of the LCD device according to an embodiment.

The rear cover 200 may be mounted on a lower end of the rear surface of the display module 100 configuring the LCD device, and as illustrated in FIG. 5, a large portion of the display module 100 may be exposed.

That is, except for a portion on which the rear cover 200 is mounted, the display module 100 itself may form an outer appearance of the LCD device. Therefore, except for the portion on which the rear cover 200 is mounted, a thickness of the LCD device may be equal to that of the display module 100. Accordingly, a thickness of the LCD device according to an embodiment is reduced compared to a thickness of a related art LCD device in which a rear cover surrounds a whole side surface and rear surface of a display module.

Figure 6:
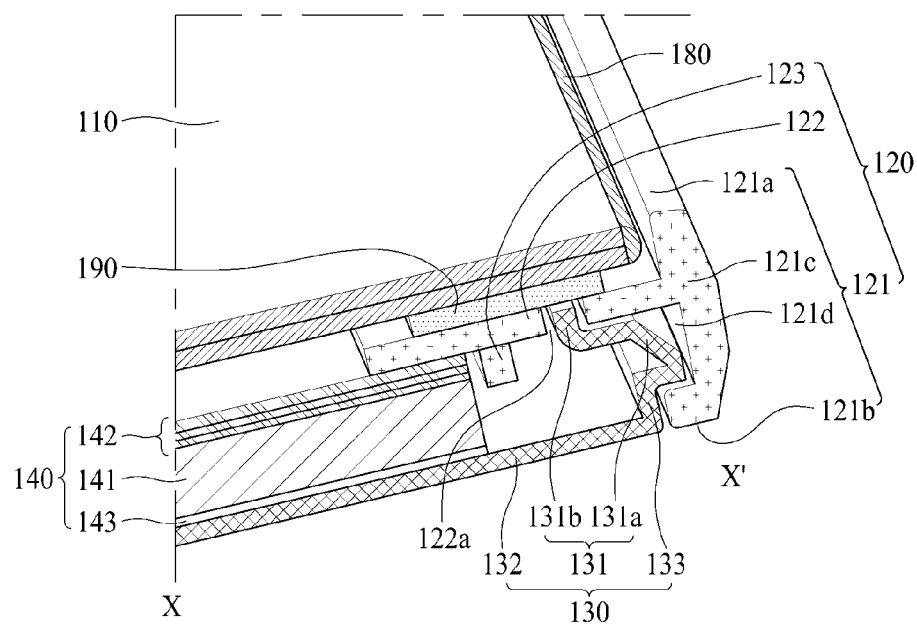
FIG. 6 is a perspective view illustrating a cross-sectional surface taken along line X-X' of FIG. 3 illustrating the LCD device according to an embodiment.
Figure 7:
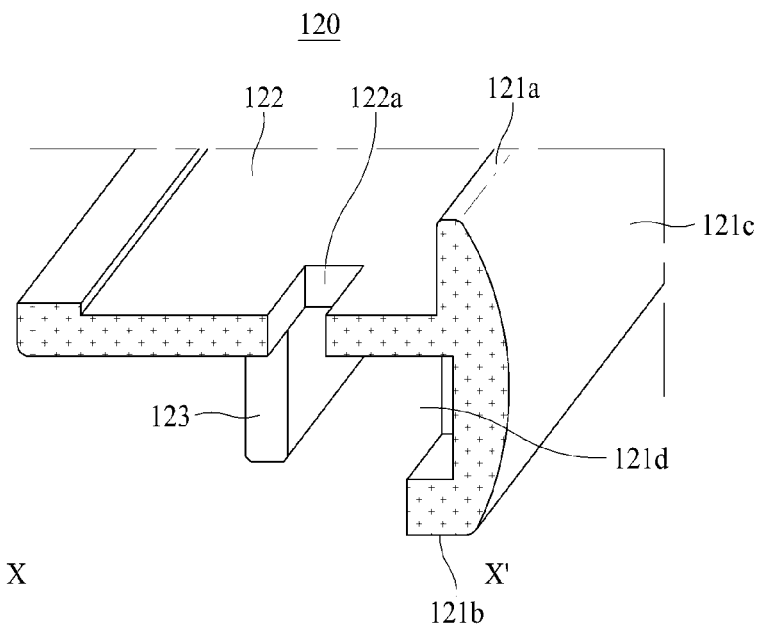
FIG. 7 is a perspective view illustrating a cross-sectional surface of a guide panel illustrated in FIG. 6.
Figure 8:
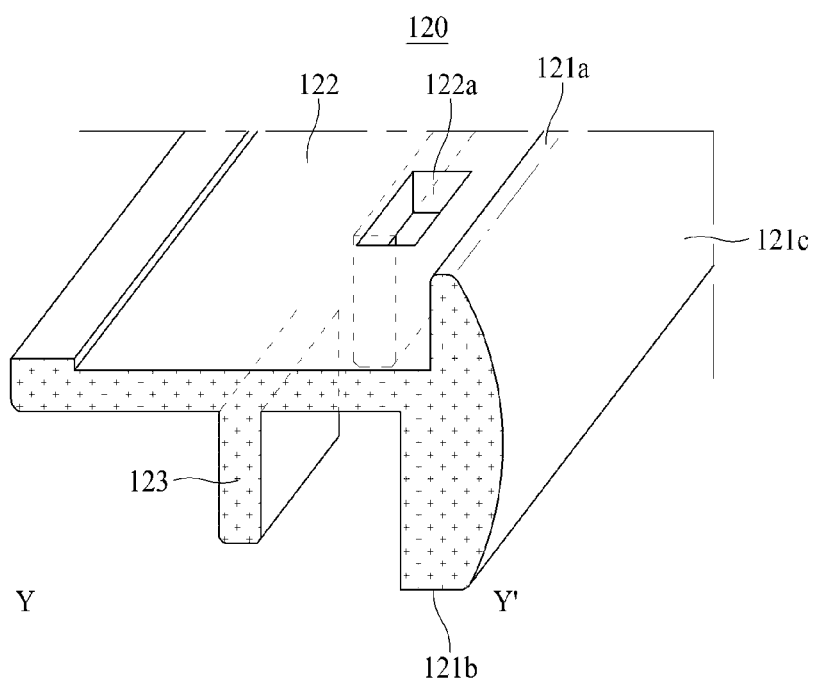
FIG. 8 is a perspective view illustrating a cross-sectional surface at another position of the guide panel illustrated in FIG. 6.
Figure 9:
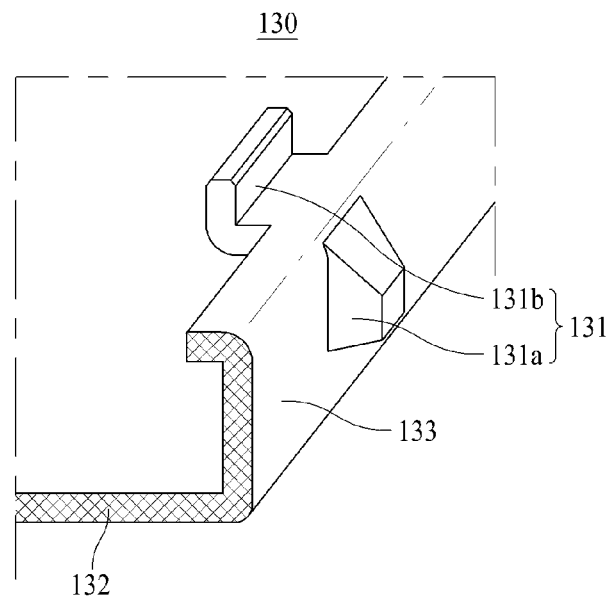
FIG. 9 is a perspective view illustrating a cross-sectional surface of a cover bottom applied to an LCD device according to an embodiment.
Figure 10:
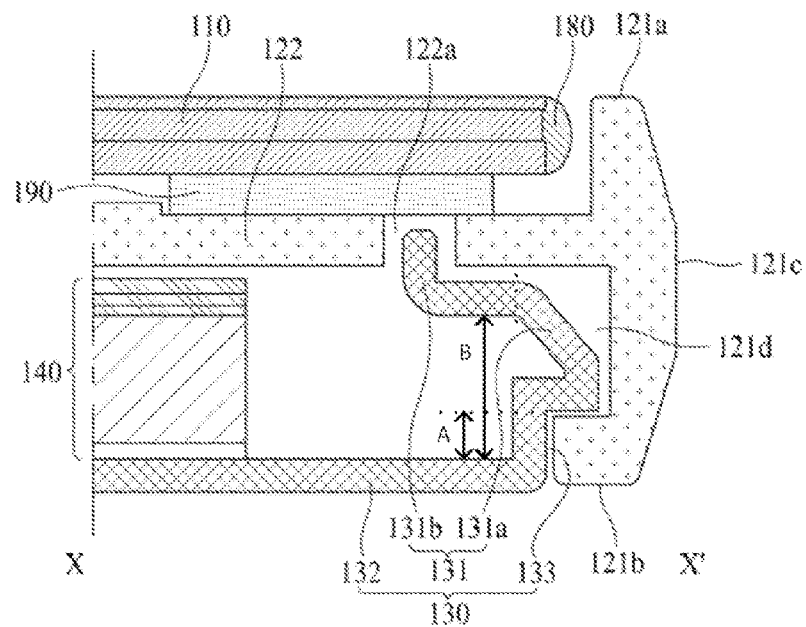
FIG. 10 is a cross-sectional view of an LCD device according to an embodiment.
Figure 11:
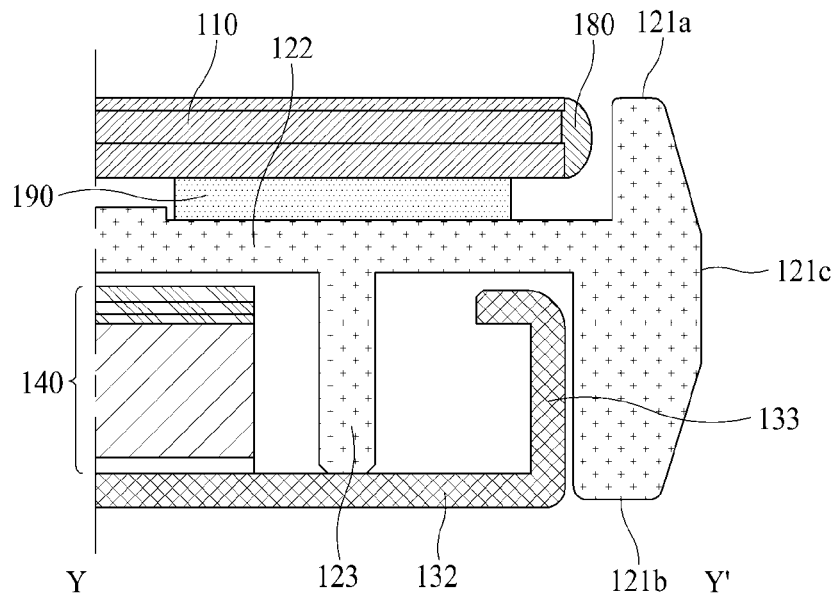
FIG. 11 is a cross-sectional view of an LCD device according to an embodiment.

FIG. 6 is a perspective view illustrating a cross-sectional surface taken along line X-X' of FIG. 3 illustrating the LCD device according to an embodiment. FIG. 7 is a perspective view illustrating a cross-sectional surface of a guide panel 120 illustrated in FIG. 6. FIG. 8 is a perspective view illustrating a cross-section at another position of the guide panel 120 illustrated in FIG. 6. In FIG. 8, a full shape of a hook insertion part 122a is illustrated. FIG. 9 is a perspective view illustrating a cross-section of a cover bottom 130 applied to an LCD device according to an embodiment. FIG. 6 illustrates a cross-sectional view of the cover bottom 130 taken along a section to show the hook part 131. FIG. 9 illustrates a cross-sectional view of the cover bottom 130 taken along a section showing the cover bottom 130 but not the hook part 131. FIG. 10 is a cross-sectional view of an LCD device according to an embodiment, and particularly, illustrates a cross-sectional surface of the guide panel 120 cut through the same portion as the cross-sectional surface illustrated in FIG. 7. FIG. 11 is a cross-sectional view of an LCD device according to an embodiment, and particularly, illustrates a cross-sectional surface of the guide panel 120 cut through the same portion as is illustrated in FIG. 8 and a cross-sectional surface of the cover bottom 130 cut through the same portion as is illustrated in FIG. 9.

The LCD device according to an embodiment, as described above, may include the display module 100 and the rear cover 200 and may further include the decorative cover 300 and the support 900.

As illustrated in FIGS. 2 to 11, the display module 100 may include the liquid crystal panel 110, the guide panel 120 that supports the rear surface of the liquid crystal panel 110 and surrounds the side surface of the liquid crystal panel 110, a light source unit 140 that irradiates light onto the liquid crystal panel 110, the cover bottom 130 that supports the light source unit 140 and includes a plurality of hooks 131a and 131b fastened to the guide panel 120, and the PCB 500 that drives the liquid crystal panel 110.

Hereinafter, the liquid crystal panel 100, the light source unit 140, and the PCB 500 will be briefly described, and then, the guide panel 120 and the cover bottom 130 will be described in detail. The display module 100 according to an embodiment, as described above, may be configured as an edge type or a direct type depending on a type of the light source unit 140. Hereinafter, for convenience of description, an edge-type display module illustrated in FIG. 6 will be described as an example.

First, the liquid crystal panel 110 may include an upper substrate, a lower substrate, and a liquid crystal injected into between the upper substrate and the lower substrate. The liquid crystal panel 110 may display an image by controlling the amount of light passing through the liquid crystal. The liquid crystal panel 110 may be attached to the guide panel 120 by double-sided tape 190. A panel protection part 180 for protecting the side surface of the liquid crystal panel 110 may be provided in the side surface. The panel protection part 180 may be formed of a silicon-based or ultraviolet (UV) curing-based sealant (or resin).

The light source unit 140 may be secured in part by the guide panel 120 and may irradiate the light onto the rear surface of the liquid crystal panel 110. The light source unit 140 may include one or more light sources (not shown), a light guide panel 141, an optical film part 142, and a reflector 143. The light sources may use various kinds of light sources, such as one or more light emitting diodes (LEDs). The light guide panel 141 may irradiate the light, emitted from each of the light sources, in a direction toward the liquid crystal panel 110. The optical film part 142 may diffuse the light passing through the light guide panel 141 or may vertically irradiate the light passing through the light guide panel 141 onto the liquid crystal panel 110. The reflector 143 may be disposed on a lower surface of the light guide panel 141 and may reflect the light, which is emitted from each of the light sources and travels in a direction toward a lower end of the light guide panel 141, in a direction toward the liquid crystal panel 110 disposed on an upper end of the light guide panel 141.

The PCB 500 may transfer various signals for driving the liquid crystal panel 110 to the liquid crystal panel 110.

Second, the cover bottom 130 may support the light source unit 140. The hooks fastened to the guide panel 120 may be provided in the cover bottom 130.

A horizontal hook 131a extending in a direction parallel to a plane of the cover bottom 130 among the hooks may be inserted into and fixed to a hook groove 121d which is provided in the guide panel 120.

A vertical hook 131b extending in a direction vertical to the plane of the cover bottom 130 among the hooks may be inserted into and fixed to the hook insertion part 122a which is provided in the guide panel 120.

The cover bottom 130 may include a plane part 132 that supports the light source unit 140 and includes a surface parallel to the rear surface of the liquid crystal panel 110, a side part 133 that is bent in a direction from an end of the plane part 132 to the liquid crystal panel 110, and a hook part 131 that includes at least one horizontal hook 131a and at least one vertical hook 131b. The horizontal hook 131a is offset from the plane part 132 by a distance A, and the vertical hook 131b is offset from the plane part 132 by a distance B, which is greater than distance A.

The horizontal hook 131a includes a first portion that extends horizontally away from an outer side of the side part 133 (i.e., horizontally away from the light guide panel 141) as well as a second portion that extends vertically upward toward the liquid crystal panel 110 and loops horizontally back toward the light guide panel 141. The vertical hook 131b includes a first portion that extends from the horizontal hook 131a toward the light source unit 140 as well as a second portion bent in a direction perpendicular to the plane part 132 and toward the liquid crystal panel 110.

The light source unit 140 may be disposed on the plane part 132. Particularly, the light guide panel 141 included in the light source unit 140 may be disposed on the plane part 132.

The side part 133 may be bent in a direction (i.e., a direction vertical to the plane part 132) from the end of the plane part 132 to the liquid crystal panel 110.

The horizontal hook 131a may protrude to the outer side of the side part 133. The inner side of the side part 133 denotes a direction facing the light guide panel 141 in the side part 133. The outer side of the side part 133 denotes a direction opposite to the inner side. Therefore, the outer side of the side part 133 denotes an outer portion of the display module 100.

The horizontal hook 131a may be inserted into the hook groove 121d provided in the guide panel 120.

The vertical hook 131b may extend to the inner side of the side part 133 and then may be bent in a direction vertical to the liquid crystal panel 110.

The vertical hook 131b may be inserted into the hook insertion part 122a provided in the guide panel 120.

Figure 1:
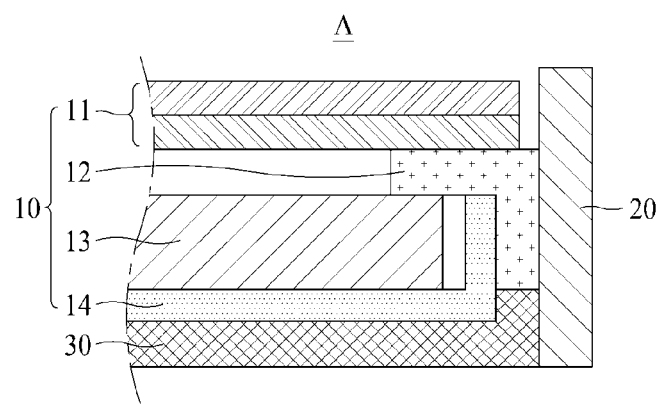
FIG. 1 is a diagram schematically illustrating a cross-sectional surface of a related art LCD device.

The related art cover bottom 14 configuring the display module, as illustrated in FIG. 1, is a built-in element that is covered by the middle frame 20 and the rear cover 30 configuring the LCD device.

On the other hand, the cover bottom 130 according to an embodiment may be formed of pre-coated metal (PCM) or may be painted. Accordingly, a design of the LCD device may be variously changed.

Third, the guide panel 120 may support the rear surface of the liquid crystal panel 110 and may surround the side surface of the liquid crystal panel 110. Also, the guide panel 120 may guide the light source unit 140.

The guide panel 120 may directly surround the side surface of the liquid crystal panel 110, thereby preventing the side surface of the liquid crystal panel 110 from being damaged in a process of manufacturing the display module 100.

Moreover, since the guide panel 120 surrounds the side surface of the liquid crystal panel 110, the LCD device does not include a separate element for surrounding the side surface of the liquid crystal panel 110. Therefore, as illustrated in FIG. 5, except for an area where the rear cover 200 is mounted, a thickness of the guide panel 120 may constitute a thickness of the LCD device. Accordingly, a thickness of the LCD device is reduced.

The liquid crystal panel 110 may be attached to the guide panel 120 by double-sided tape 190. However, the liquid crystal panel 110 may be disposed in the guide panel 120 without double-sided tape, and in this case, an outer portion of the front surface of the liquid crystal panel 110 may be covered by the guide panel 120. For example, in FIG. 6, it is illustrated that the guide panel 120 does not cover the outer portion of the front surface of the liquid crystal panel 110, but the guide panel 120 may cover the outer portion of the front surface of the liquid crystal panel 110.

Hereinafter, the guide panel 120 illustrated in FIG. 6 will be described as an example of a guide panel applied to the present disclosure.

The guide panel 120 may include a first guide part 121, which surrounds the side surface of the liquid crystal panel 110, and a second guide part 122 that protrudes in a direction parallel to the liquid crystal panel 110 from the first guide part 121 and supports the liquid crystal panel 110.

The first guide part 121 may include the first surface 121a exposed in a direction toward the front surface of the LCD device, the second surface 121b exposed in a direction toward the rear surface of the LCD device, and the third surface 121c exposed in a direction toward the side surface of the LCD device.

In FIG. 6, the first surface 121a may not cover the outer portion of the front surface of the liquid crystal panel 110. However, as described above, when the outer portion of the front surface of the liquid crystal panel 110 is covered, the first surface 121a may extend in a direction toward the liquid crystal panel 110 to cover the outer portion of the front surface of the liquid crystal panel 110.

The hook groove 121d may be provided in an inner side of the first guide part 121. The inner side of the first guide part 121 denotes a direction facing the horizontal hook 131a in the first guide part 121. An outer side of the first guide part 121 denotes a direction opposite to the inner side. Therefore, the outer side of the first guide part 121 denotes an outer portion of the display module 100.

One or more hook grooves 121d may be provided along the inner side of the first guide part 121. The horizontal hook 131a may be inserted into the hook groove 121d. The number of the hook grooves 121d and the number of the horizontal hooks 131a may depend on the size and shape of the display module 100.

The second guide part 122 may support the liquid crystal panel 110. To this end, the second guide part 122 may protrude in a direction parallel to the liquid crystal panel 110 from the first guide part 121.

Double-sided tape 190 may be attached to the second guide part 122, and the liquid crystal panel 110 may be fixed to the second guide part 122 by double-sided tape 190.

The hook insertion part 122a may be included in the second guide part 122. The hook insertion part 122a, as illustrated in FIGS. 6 and 7, may have a hole form passing through the second light guide part 122 toward an area where the plane part 132 of the cover bottom 130 is disposed and toward an area where the liquid crystal panel 110 is disposed. However, the hook insertion part 122a may be provided in a groove form.

The vertical hook 131b may be inserted into the hook insertion part 122a. The number of the hook insertion parts 122a and the number of the vertical hooks 131b may depend on the size and shape of the display module 100.

Since the guide panel 120 and the cover bottom 130 are fastened to each other by the horizontal hook 131a and the vertical hook 131b which are provided in the cover bottom 130, a process of manufacturing the display module and the LCD device is simplified.

Particularly, the horizontal hook 131a protruding in a direction parallel to the plane part 132 of the cover bottom 130 may be inserted into and fixed to the hook groove 121d provided in the guide panel 120, and the vertical hook 131b protruding in a direction vertical to the plane part 132 of the cover bottom 130 may be inserted into and fixed to the hook insertion part 122a provided in the guide panel 120, thereby increasing a fastening force between the guide panel 120 and the cover bottom 130.

The guide panel 120 may further include a rib 123.

The rib 123, as illustrated in FIGS. 8 and 11, may protrude in a direction from the second guide part 122 to the cover bottom 130. For example, the rib 123 may protrude a direction from a surface of the second guide 122 facing the plane part 132 toward the plane part 132.

The rib 123 may be provided continuously along the second guide part 122, but as illustrated in FIGS. 7 and 8, the rib 123 may not be provided in a portion where the hook insertion part 122a is provided.

The rib 123 may be disposed to surround the side surface of the light source unit 140. For example, in an edge-type display module, as illustrated in FIG. 11, the rib 123 may be disposed to surround the side surface of the light guide panel 141, and in a direct-type display module, the rib 123 may be disposed to surround the light source unit 140.

According to an embodiment, since the rib 123 covers the light source (not shown) or the side surface of the light guide panel 141 on which the light emitted from the light source is incident, the light which is emitted from the light source or irradiated through the light guide panel 141 is prevented from being leaked to the outside of the display module 100 through the guide panel 120. Accordingly, a number of defectively manufactured display modules caused by light leakage is reduced.

Moreover, the rib 123 prevents foreign substances from penetrating into the light source unit 140.

The related art guide panel 12 configuring the display module, as illustrated in FIG. 1, is a built-in element that is covered by the middle frame 20 configuring the LCD device. Therefore, the related art guide panel 12 uses black polycarbonate (PC).

However, the guide panel 120 according to an embodiment may form a final appearance of the LCD device. Therefore, when black PC is applied as-is, the quality of an outer appearance is degraded. For example, when guide panel 120 is injected by using PC, undesired lines, such as weld lines, are formed in a surface of the guide panel 120, or the surface of the guide panel 120 is contracted or warped, causing wrinkles.

In order to prevent such problems, the surface of the guide panel 120 according to an embodiment may be roughly processed. To this end, a method of roughly forming a surface of an injector may be used.

A method of roughly processing the surface of the guide panel 120 may be referred to as a texture method.

By using the texture method, a defect such as the weld line or contraction is prevented from occurring when manufacturing the guide panel 120 through an injection method.

Since the surface of the guide panel 120 forming the outer appearance of the LCD device is roughly processed, a defect of the outer appearance of the LCD device is prevented.

Moreover, the surface of the guide panel 120 may be painted in various colors. Accordingly, a design of the LCD device may be variously changed.

Figure 12:
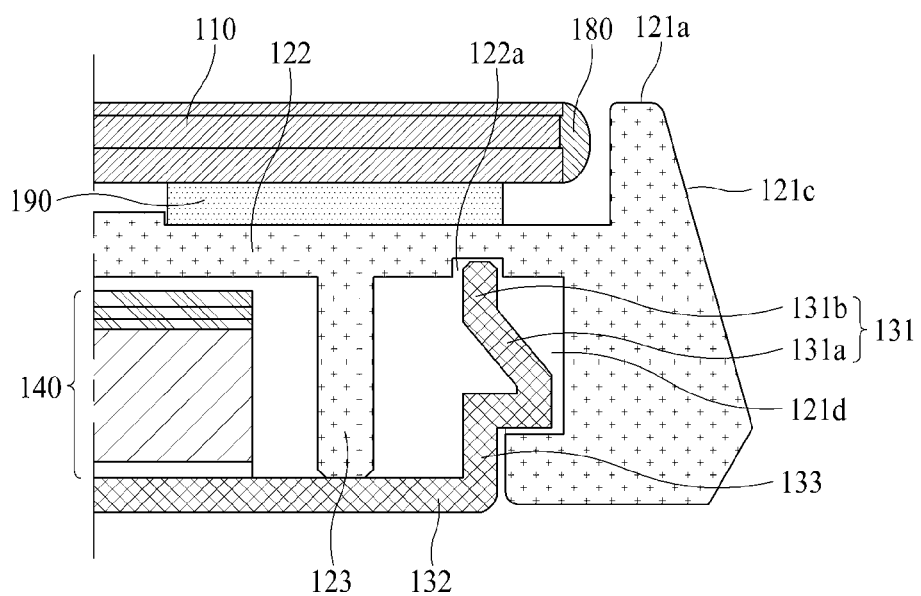
FIG. 12 is a cross-sectional view of an LCD device according to an embodiment.

FIG. 12 is a cross-sectional view of an LCD device according to an embodiment. In the following description, details which are the same as or similar to the above-described details are omitted or will be briefly described.

As described above with respect to the LCD device illustrated in FIGS. 6-10, the horizontal hook 131a may be inserted into the hook groove 121d provided in the guide panel 120, the vertical hook 131b may be inserted into the hook insertion part 122a, and the guide panel 120 may be fastened to the cover bottom 130.

In this case, as described above, the hook insertion part 122a may be provided in a hole form passing through the second guide part 122 as illustrated in FIG. 10, or as illustrated in FIG. 12, the hook insertion part 122a may be provided in a groove form in a surface of the second guide part 122 facing the cover bottom 130. As illustrated in FIG. 12, the hook insertion part 122a and the vertical hook 131b may be aligned with the side part 133.

The rib 123 may surround the side surface of the light source unit 140 and may be closely adhered to the plane part 132 of the cover bottom 130. However, the rib 123 may be spaced apart from the plane part 132 by a certain interval.

The outer appearance of the guide panel 120 may be modified to various shapes. For example, the third surface 121c of the guide panel 120 illustrated in FIGS. 10 and 11 and the third surface 121c of the guide panel 120 illustrated in FIG. 12 may be provided in different shapes.

The guide panel 120 may form the outer appearance of the LCD device.

As described above, since the outer appearance of the guide panel 120 is modified to various shapes, the outer appearance of the LCD device may also be formed in various shapes.

As described above, according to the embodiments of the present disclosure, since the display module itself forms an outer appearance of the LCD device, a thickness of the LCD device is reduced compared to the related art.

Moreover, according to the embodiments of the present disclosure, the guide panel configuring the display module may directly surround the side surface of the liquid crystal panel configuring the display module, thereby preventing the side surface of the liquid crystal panel from being damaged in a process of manufacturing the display module.

Moreover, according to the embodiments of the present disclosure, since the guide panel and the cover bottom configuring the display module are fastened to each other by the hooks provided in the cover bottom, a process of manufacturing the display module is simplified.

Particularly, the horizontal hook protruding in a direction parallel to a plane of the cover bottom among the hooks in the cover bottom may be inserted into and fixed to the hook groove in the guide panel, and the vertical hook protruding in a direction vertical to the plane of the cover bottom among the hooks in the cover bottom may be inserted into and fixed to the hook insertion part, thereby increasing a fastening force between the guide panel and the cover bottom.

Moreover, according to the embodiments of the present disclosure, the light source configuring the display module or the rib covering the side surface of the light guide panel on which light emitted from the light source is incident may be provided in the guide panel. Accordingly, the light which is emitted from the light source or is irradiated through the light guide panel is prevented from being leaked to the outside of the display module through the guide panel.

Moreover, according to the embodiments of the present disclosure, the surface of the guide panel forming the outer appearance of the LCD device may be roughly processed, thereby preventing a defect of the outer appearance of the LCD device.

Moreover, according to the embodiments of the present disclosure, by variously designing the guide panel, the design of the LCD device may be variously changed.

Moreover, according to the embodiments of the present disclosure, since the cover bottom forming the outer appearance of the LCD device is formed of PCM or is painted, the design of the LCD device may be variously changed.

It will be apparent to those skilled in the art that various modifications and variations can be made in the present disclosure without departing from the spirit or scope thereof. Thus, it is intended that the present disclosure covers modifications and variations that come within the scope of the appended claims and their equivalents.

What is claimed is:

1. A display module comprising:
   a liquid crystal panel;
   a guide panel supporting a rear surface of the liquid crystal panel and surrounding a side surface of the liquid crystal panel;
   a light source unit irradiating light onto the liquid crystal panel; and
   a cover bottom supporting the light source unit and including a plurality of hooks fastened to the guide panel, the plurality of hooks including:
   a horizontal hook protruding in a direction parallel to a plane of the cover bottom, the horizontal hook inserted into and fixed to a hook groove in the guide panel, and
   a vertical hook protruding in a direction perpendicular to the plane of the cover bottom, the vertical hook inserted into a hook insertion part in the guide panel.

2. The display module of claim 1, wherein the cover bottom comprises:
   a plane part supporting the light source unit, the plane part including a surface parallel to the rear surface of the liquid crystal panel;
   a side part bent in a direction from an end of the plane part to the liquid crystal panel; and
   a hook part including at least one horizontal hook extending to an outer side of the side part and at least one vertical hook that extends to an inner side of the side part and is bent in the direction perpendicular to the plane part.

3. The display module of claim 1, wherein the guide panel comprises:
   a first guide part surrounding the side surface of the liquid crystal panel, the hook groove disposed in the first guide part; and
   a second guide part protruding in a direction parallel to the liquid crystal panel from the first guide part and supporting the liquid crystal panel, the hook insertion part disposed in the second guide part.

4. The display module of claim 3, wherein the guide panel further comprises a rib protruding in a direction from the second guide part to the cover bottom and surrounding a side surface of the light source unit.

5. The display module of claim 1, the guide panel is manufactured using injection molding and is painted.

6. The display module of claim 1, wherein the hook insertion part includes at least one of a hole in the guide panel or a groove in the guide panel.

7. A liquid crystal display (LCD) device comprising:
a display module comprising:
a liquid crystal panel;
a guide panel supporting a rear surface of the liquid crystal panel and surrounding a side surface of the liquid crystal panel;
a light source unit irradiating light onto the liquid crystal panel; and
a cover bottom supporting the light source unit, a plurality of hooks fastened to the guide panel being disposed in the cover bottom, the plurality of hooks including:
a horizontal hook protruding in a direction parallel to a plane of the cover bottom, the horizontal hook inserted into and fixed to a hook groove in the guide panel, and
a vertical hook protruding in a direction perpendicular to the plane of the cover bottom, the vertical hook inserted into a hook insertion part in the guide panel; and
a rear cover covering a portion of a rear surface of the display module and protecting a printed circuit board driving the display module.

8. The LCD device of claim 7, further comprising a pad mounted on a rear surface of the cover bottom covered by the rear cover, the pad fastened to the rear cover.

9. The LCD device of claim 8, wherein the pad comprises first, second, and third segments corresponding to first, second, and third sides of the printed circuit board, the first and third segments connected to the second segment, the second segment disposed between the second side of the printed circuit board and an exposed exterior portion of the display module not covered by the rear cover.

10. The LCD device of claim 8, wherein the LCD device includes a decorative cover on a front surface of the display module opposite the rear surface, wherein a fastener secures the decorative cover to a portion of the rear cover corresponding to a fourth side of the printed circuit board.

11. A display module comprising:
a liquid crystal panel;
a light source unit irradiating light onto the liquid crystal panel;
a cover bottom supporting the light source unit, the cover bottom including:
a plane part extending parallel to a top surface of the liquid crystal panel,
a first hook portion extending perpendicular to the top surface of the liquid crystal panel, and
a second hook portion between the plane part and the first hook portion, the second hook portion extending in a direction different from a direction in which the first hook portion extends, the second hook portion offset from the plane part by a first distance in a direction perpendicular to the top surface of the liquid crystal panel; and
a guide panel supporting a rear surface of the liquid crystal panel, the guide panel including:
a hook insertion part configured to receive the first hook portion, and
a hook groove configured to receive the second hook portion.

12. The display module of claim 11, wherein the guide panel includes:
a first guide part extending over a side surface of the liquid crystal panel in a direction perpendicular to the top surface of the liquid crystal panel, the first guide portion including the hook groove; and
a second guide part protruding away from the first guide part and supporting the rear surface of the liquid crystal panel, the second guide part including the hook insertion portion.

13. The display module of claim 12, wherein the hook groove is disposed on a side of the first guide part facing the light source unit.

14. The display module of claim 12, wherein the guide panel further includes a rib protruding from a surface of the guide panel facing away from the liquid crystal panel toward the plane part at least partially over a side surface of the light source unit.

15. The display module of claim 12, wherein the rib protrudes from the second guide part to the plane part of the cover bottom, and an end of the rib is adhered to the plane part.

16. The display module of claim 12, wherein the rib protrudes from the second guide part past a light guide panel of the light source unit, and an end of the rib opposite the second guide part is spaced apart from the plane part of the cover bottom.

17. The display module of claim 12, wherein the cover bottom includes a side part connecting the plane part to the second hook portion, the side part extending toward the second guide part of the guide panel and away from the plane part to separate the second hook portion from the plane part by the predetermined distance perpendicular to the top surface of the liquid crystal panel.

18. The display module of claim 17, wherein the second hook portion includes a first part extending horizontally away from the side part and a second part extending vertically upward from the first part toward the liquid crystal panel, the second part bent toward the liquid crystal panel.

19. The display module of claim 11, wherein the first hook portion includes a first part extending from the second hook portion toward the light source unit and a second part connected to the first part and bent in the direction perpendicular to the top surface of the liquid crystal panel.

20. The display module of claim 11, wherein the first hook portion is offset from the plane part by a second distance in the direction perpendicular to the top surface of the liquid crystal panel, the second distance greater than the first distance.

* * * * *